May 13, 1952     G. L. MEYERS ET AL     2,596,780
RESILIENT MEMBER AND FASTENING DEVICE THEREFOR
Filed July 9, 1947     2 SHEETS—SHEET 1
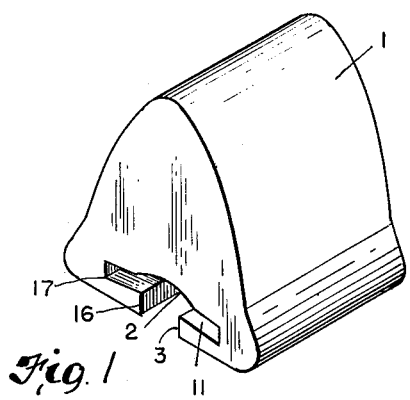
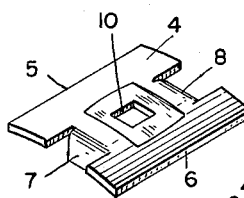
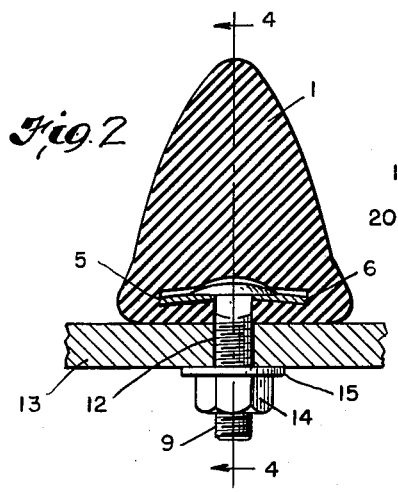
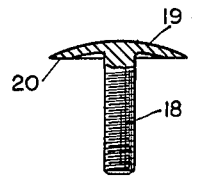
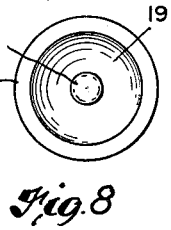
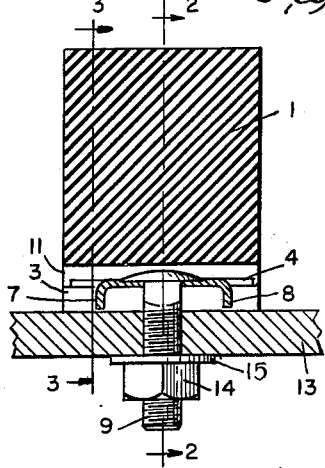
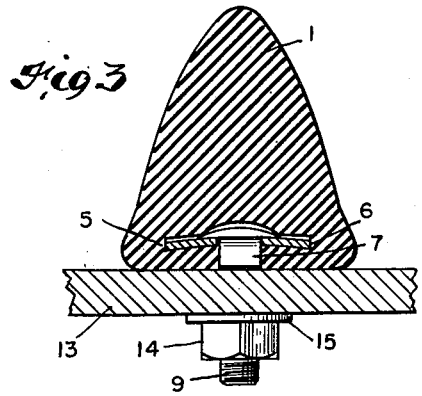
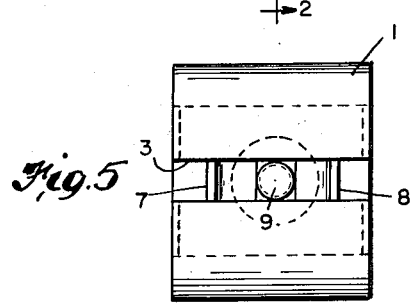
INVENTOR.
GEORGE L. MEYERS +
BY   JOHN C. SHUTT
Oberlin + Limbach
ATTORNEYS.

May 13, 1952 G. L. MEYERS ET AL 2,596,780
RESILIENT MEMBER AND FASTENING DEVICE THEREFOR
Filed July 9, 1947 2 SHEETS—SHEET 2
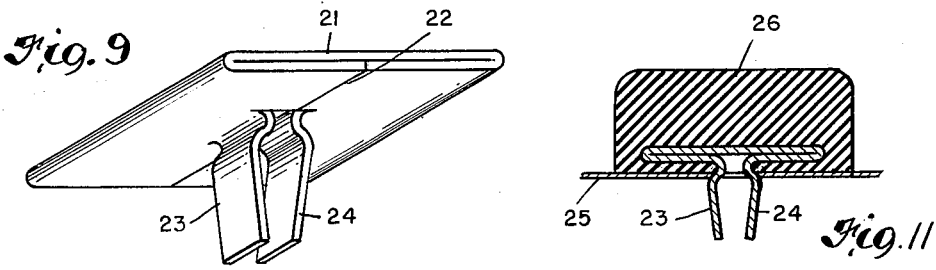
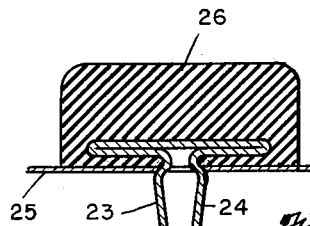
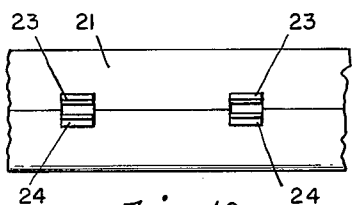
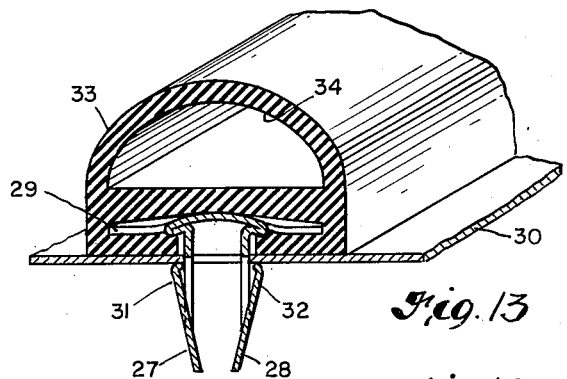
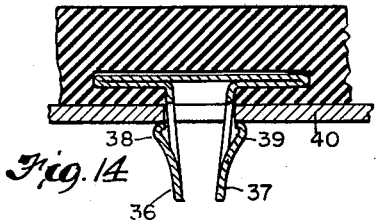
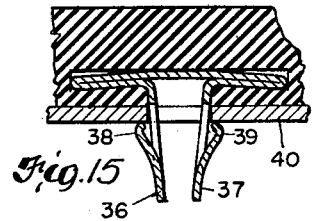
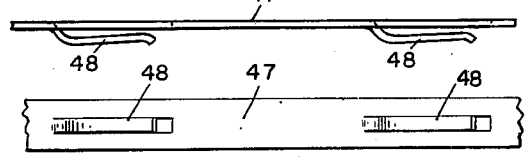
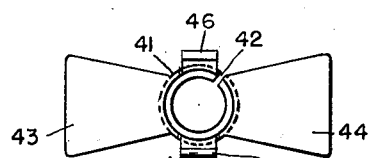
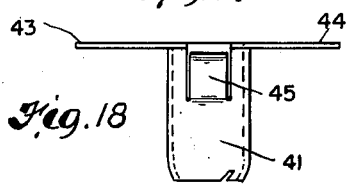
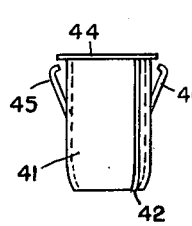
INVENTORS
GEORGE L. MEYERS +
BY JOHN C. SHUTT
Oberlin + Limbach
ATTORNEYS.

Patented May 13, 1952

2,596,780

UNITED STATES PATENT OFFICE 2,596,780

RESILIENT MEMBER AND FASTENING DEVICE THEREFOR

George L. Meyers, Willoughby, and John C. Shutt, Wickliffe, Ohio, assignors to The Ohio Rubber Company, Willoughby, Ohio, a corporation of Ohio Application July 9, 1947, Serial No. 759,864

19 Claims. (Cl. 267—63)

This invention relates, as indicated, to resilient members and fastening devices therefor, and more particularly to resilient cushioning or sealing members such as door bumpers, automobile suspension bumpers, continuous strips serving both as cushioning members and seals as for refrigerator doors and the like, weather stripping, and window seals.

Resilient members of this type may ordinarily be formed either by molding or extrusion of rubber compositions and the like in plastic form, the product then being cured and, in the case of the extruded form, cut into desired lengths. There are certain advantages in extruding members of this type, such as the fact that the same may be produced in continuous lengths ordinarily at less expense than by molding the articles individually. It is, however, possible to extrude only certain shapes, and it is one object of this invention to provide an extruded resilient member formed to facilitate fastening of the same to an apertured support.

In some cases the other side of the supporting means is inaccessible so that the fastening device for the resilient members must be operative from the outer side. It is a further object of this invention to provide fastening devices adapted to be so operative.

When subjected to repeated impact resilient compressible material, such as rubber, tends to creep from under the usual clamping means. It is, therefore, another object of this invention to provide a resilient member and a fastening device therefor so formed as to cooperate in resisting such tendency.

Still another object is to provide such resilient members and fastening devices therefor which will be both inexpensive of manufacture and adapted to be quickly attached to the supporting means.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a perspective view of an automobile suspension bumper embodying certain aspects of our invention;

Fig. 2 is a vertical sectional view taken on line 2—2 on Fig. 4 through such a member shown mounted upon an apertured support;

Fig. 3 is another vertical sectional view of such mounted bumper taken along the lines 3—3 on Fig. 4 in a plane parallel to that of Fig. 2;

Fig. 4 is a vertical sectional view of such mounted bumper taken along the line 4—4 on Fig. 2;

Fig. 5 is a bottom plan view of such bumper with the fastening device assembled therewith;

Fig. 6 is a perspective view of one element of such fastening device;

Fig. 7 is a vertical sectional view of an alternative form of fastening device;

Fig. 8 is a bottom plan view of such last form of fastening device;

Fig. 9 is a perspective view of another form of fastening device adapted to be employed in conjunction with the resilient members of our invention;

Fig. 10 is a bottom plan view of a multiple form of the fastening device shown in Fig. 9;

Fig. 11 is a vertical sectional view through another form of resilient member and the fastening device of Fig. 9 securing the same to an apertured support;

Fig. 12 is a side elevational view of another form of fastening device;

Fig. 13 is a vertical sectional view showing the employment of such device in securing an elongated sealing gasket to an apertured support;

Fig. 14 is a similar vertical sectional view showing a modified form of such attaching means;

Fig. 15 is a view similar to that of Fig. 14 but showing opposite edges of the head portion of such fastening device downwardly inclined;

Fig. 16 is a side elevational view of the fastening device of Fig. 15;

Fig. 17 is a top plan view of another form of fastening device;

Fig. 18 is a side elevational view of the device of Fig. 17;

Fig. 19 is another elevational view of the device of Fig. 17 taken at right angles to the view of Fig. 18;

Fig. 20 is an edge-wise view of a continuous form of attaching means adapted to be employed to secure sealing strips and the like to an apertured support; and Fig. 21 is a top plan view of such latter form.

Referring now more particularly to said drawings, and especially Figs. 1-8 thereof, one embodiment of our invention comprises a resilient compressible rubber member 1 adapted to be extruded in continuous lengths and then cut into desired sections. The member illustrated is designed for use as an automobile suspension bumper to prevent contact of the frame and axle when a shock is received of greater magnitude than can be cushioned by the springs alone. As best shown in Figs. 1 and 2 such member is extruded with a T-shaped slot 2 in its under-surface with the stem of such T extending to such surface. Various attaching means for bumpers have been employed in the past, none of them being entirely satisfactory. The bumper could be cemented or vulcanized to the support, or an attaching means could be inserted and vulcanized in the rubber member. Such methods were slow and expensive for large scale production. We have provided a form of fastening device generally comprising a laterally extending head portion, a stem portion extending therefrom and adapted to enter an aperture in the supporting means, and means operative to secure such stem portion in the aperture.

In the embodiment illustrated in Figs. 2-6 inclusive, such fastening device comprises a rectangular washer 4 having two opposite edges 5 and 6 downwardly inclined and a pair of lugs 7 and 8 turned down from the other two edges intermediate said first named edges. Bolt 9 with a square stem portion adapted to fit in opening 10 of the washer is inserted therethrough and such washer is inserted in the cross portion 11 of the T slot in member 1 with such downwardly inclined edge portions parallel to the lengthwise direction of the slot and the lugs 7 and 8 fitting in the stem portion 3 of the slot. The washer with the bolt inserted therethrough may be placed in the slot as above described either by sliding the same in from one end of such slot or by bending back one of the rubber flanges defining the cross portion of the slot. The bolt 9 may then be inserted in aperture 12 in support 13 and secured therein by means of nut 14 and lock washer 15.

The rubber flanges defining the cross portion 11 of the T-shaped slot in member 1 will desirably be formed of greater thickness adjacent the stem of such T as at 16 than at the lateral extremities 17 thereof so that the rubber constituting such flanges completely fills the space laterally of bolt 9 and underlying the downwardly inclined portions of washer 4. It will thus be seen that when member 1 is tightly secured in place, as shown in Fig. 2 for example, such downwardly inclined portions 5 and 6 will be drawn into tight clamping engagement with the underlying portions of such member and the thicker flange portions 16 adjacent bolt 9 will, in effect, be trapped beneath the downwardly curved washer. As a result, member 1 may be subjected to repeated heavy impact, normally having an effect tending to spread the base thereof, without causing the rubber underlying the head of the fastening device to creep laterally and gradually work loose.

A somewhat simpler form of fastening device which is satisfactory where the stresses and strains to be encountered are not too great is illustrated in Figs. 7 and 8 of the drawing. Such device comprises a bolt 18 having a cupped or mushroom head 19 which is adapted to be inserted into the cross portion of the slot in the rubber member in the same manner as washer 4. The bolt may then be similarly attached to the apertured support. Upon being drawn tight it will be apparent that the greatest clamping pressure will be applied by portions of the outer periphery 20 of head 19 whereby tendency of the underlying rubber to creep is overcome.

Figs. 9-16 inclusive show three generally similar forms of fastening devices, each comprising a relatively flat laterally extending sheet metal head portion folded with two edges thereof opposed, and a stem portion comprising respective extensions of such opposed edge portions generally normal to the flat head portion. As best shown in Fig. 9, the flat sheet metal head portion 21 is folded over to oppose two of its edges at 22. Extensions 23 and 24 of such respective edges project generally normally to the flat head portion and together comprise a stem portion adapted to be inserted in an apertured support 25 to firmly secure a bumper 26 or other resilient member thereto, as shown in Fig. 11. Extensions 23 and 24 are thus seen to be deformed to serve as a spring clip whereby the resilient member may be secured to such apertured support even though the other side of the support may be inaccessible. The resilient member is shown formed with a T slot therein of the same general character as above described. Fig. 10 shows a multiple form of such attaching means having a plurality of such extensions 23 and 24 at spaced intervals therealong located to conform to a similar arrangement of apertures in the supporting member. It will be seen that a resilient member in the form of a long strip or gasket, for example, may be mounted upon such unitary multiple fastening device and then secured to the supporting member. This form of fastening device also obviously aids in lending longitudinal rigidity to the resilient member. Of course, a series of individual attaching devices such as shown in Fig. 9 may be alternatively employed although with somewhat less convenience since the same must be then properly positioned along the length of the resilient strip so as to coincide with the apertures in the supporting member.

The form of the device illustrated in Figs. 12 and 13 has only opposite centrally located portions 27 and 28 folded over from the flat sheet metal head portion 29 to form the stem portion for attachment to the apertured support 30. Prongs 31 and 32 on said extensions 27 and 28 respectively are adapted to engage the underside of support 30 when such stem portion is forced through an aperture therein as shown in Fig. 13. In such Fig. 13 the head 29 of the fastening device which is of generally rectangular form is shown inserted in the T slot of a continuous sealing strip 33 having an internal cavity 34 to enhance the compressibility thereof.

Figs. 14-16 inclusive show a fastening device similar to that of Fig. 9 in that two edges of the sheet metal head portion 35 are folded over and provided with extensions 36 and 37 serving as a stem portion. Prongs 38 and 39 similar to prongs 31 and 32 are, however, formed in such respective extensions to serve as a spring clip and engage the underside of the apertured support 40 as shown in Figs. 14 and 15. Fig. 15 shows the fastening device of Fig. 14 but with the opposite folded edges of the head portion downwardly inclined to enhance the clamping action of the device as above explained. It will be noted that each of the fastening devices illustrated and described may desirably be thus deformed and the flange or lip of the resilient member underlying the same will likewise preferably be of greater thickness adjacent the stem of such fastening device than adjacent the outer edge portions of the head thereof.

Figs. 17-19 inclusive show a form of attaching device somewhat similar to that disclosed and claimed in our co-pending application Serial No. 692,780, filed August 24, 1946, now Patent No. 2,590,264, issued Mar. 25, 1952. In this embodiment of the invention a tubular stem portion 41 may be slotted as at 42 and provided with laterally extending wings or flanges 43 and 44. A pair of prongs 45 and 46 are disposed on opposite sides of such tubular stem portion 41 to engage the underside of an apertured support when such stem portion is inserted therein. Flanges 43 and 44, of course, engage in the cross portion of the T slot in the resilient member.

Figs. 20 and 21 show a relatively simple form of attaching means adapted to be stamped from a continuous strip of metal 47. This strip of metal is adapted to be engaged in the T slot in the resilient member in the same manner as the form shown in Fig. 10. The projecting rebent hooks or prongs 48 are then inserted in small apertures appropriately spaced in the supporting member and the entire assembly of resilient member and fastening device may then be shifted longitudinally to obtain secure attachment. Due to the recurved form of prongs 48 a spring clamping action is obtained tightly gripping the support. This means is, of course, particularly adapted for use where a long resilient strip is to be disposed vertically on the supporting member.

It will be seen from the foregoing that we have provided a novel type of resiliently deformable member particularly adapted for use in conjunction with our new form of attaching device whereby both such resilient member and such attaching device are adapted to rapid and inexpensive manufacture as well as being quickly and securely assembled to the supporting means.

While the rubber element of our new bumper such as that shown in Fig. 2, for example, may be extruded in continuous lengths and then cut into desired sections it will be understood that long strips of similar form may likewise be molded and then cut in sections. Or such sections may be molded individually.

Other modes of applying the principle of the invention may be employed, change being made as regards the details described, provided the features stated in any of the following claims, or the equivalent of such, be employed.

We therefore particularly point out and distinctly claim as our invention:

1. In combination, a resilient cushioning member and means for attaching the same to an apertured support, comprising a member of resilient deformable material having a T-shaped slot in one surface thereof with the stem of such T extending to such surface, and attaching means having a laterally extending head portion adapted to engage in the cross portion of such slot, a stem portion adapted to extend into such aperture, and means operative to secure said stem in such aperture, opposite edges of said head portion being turned downwardly to tightly engage said deformable member along the respective inner edges of such T slot when said stem is thus secured.

2. In combination, a resilient cushioning member and means for attaching the same to an apertured support, comprising a member of resilient deformable material having a T-shaped slot in one surface thereof with the stem of such T extending to such surface, and attaching means having a head portion adapted to engage in the cross portion of such slot, a stem portion adapted to extend into such aperture, and means operative to secure said stem in such aperture and thereby forcibly to draw said head portion toward such support to grip such deformable material therebetween.

3. Means for attaching an elongated strip member of resilient deformable material to an apertured support, comprising a relatively flat laterally extending sheet metal head portion folded with two edges thereof opposed, a plurality of spaced stem portions comprising respective extensions of such opposed edge portions generally normal to said flat head portion, and spring clip means on said stem portions operative to secure said stem portions in such apertures, the opposite folded edges of said head portion being downwardly inclined.

4. Means for attaching an elongated strip member of resilient deformable material to an apertured support, comprising a relatively flat laterally extending sheet metal head portion folded with two edges thereof opposed, a plurality of spaced stem portions comprising respective extensions of such opposed edge portions generally normal to said flat head portion, and means operative to secure said stem portions in such apertures, opposite edges of said head portion being downwardly inclined.

5. Means for attaching an elongated strip member of resilient deformable material to an apertured support, comprising a laterally extending sheet metal head portion folded with two edges thereof opposed, a plurality of spaced stem portions comprising respective extensions of such opposed edge portions generally normal to said head portion, and spring clip means operative to secure said stem portions in such apertures.

6. Means for attaching an elongated strip member of resilient deformable material to an apertured support, comprising a laterally extending sheet metal head portion folded with two edges thereof opposed, a plurality of spaced stem portions comprising respective extensions of such opposed edge portions generally normal to said head portion, and means operative to secure said stem portions in such apertures.

7. Means for attaching an elongated strip member of resilient deformable material to an apertured support, comprising a laterally extending head portion, a plurality of spaced stem portions adapted to enter such apertures, and means operative to secure said stem portions in such apertures, opposite edges of said laterally extending head portion being downwardly inclined.

8. In combination, a resilient compressible rubber bumper and means for attaching the same to an apertured support, comprising a resilient rubber member having a T-shaped slot in one surface thereof with the stem of such T extending to such surface, said slot extending the entire length of said member with the rubber between such surface and the cross portion of said slot being of greater thickness adjacent the stem of such T than at the lateral extremities thereof, and attaching means therefor comprising a metal washer of general rectangular form having two opposite edge portions downwardly inclined, said washer engaging in the cross portion of said slot with such downwardly inclined edge portions lying along such lateral extremities thereof, a pair of lugs turned down from the other two edges of said washer intermediate said first-named edges and fitting in the stem of said T slot, and bolt means passing through said washer adapted to engage the same and be secured in such aperture.

9. In combination, a resilient cushioning member and means for attaching the same to an apertured support, comprising a member of resiliently deformable material having a T-shaped slot in one surface thereof with the stem of such T extending to such surface, and attaching means therefor comprising a metal washer of general rectangular form having two opposite edge portions downwardly inclined, said washer engaging in the cross portion of said slot with such downwardly inclined edge portions parallel to the lengthwise direction of said slot, a pair of lugs turned down from the other two edges of said washer intermediate said first-named edges, said lugs fitting in the stem of said T slot, and bolt means passing through said washer adapted to engage the same and be secured in such aperture.

10. In combination, a resilient cushioning member and means for attaching the same to an apertured support, comprising a member of resiliently deformable compressible material having a T-shaped slot in one surface thereof with the stem of such T extending to such surface, and attaching means therefor comprising a metal washer of general rectangular form having two opposite edge portions downwardly inclined, said washer engaging in the cross portion of said slot with such downwardly inclined edge portions parallel to the lengthwise direction of said slot, and bolt means passing through said washer adapted to engage the same and be secured in such aperture.

11. In combination, a resiliently deformable rubber member and means for attaching the same to an apertured support, comprising a resilient rubber member having a T-shaped slot in one surface thereof with the stem of such T extending to such surface, and attaching means comprising a cylindrical portion adapted to pass through such aperture, side flanges adapted to engage in the cross portion of such slot, and spring clip means on said cylindrical portion adapted to secure the same in such aperture.

12. In combination, an elongated resiliently deformable rubber member and means for attaching the same to an apertured support, comprising a T-shaped slot extending longitudinally of one surface of said member with the stem of such T extending to such surface, a continuous metal strip engaged in the cross portion of such slot, and a plurality of stem members secured to said strip and protruding from said slot adapted to be secured in corresponding apertures in such support.

13. In combination, an elongated resiliently deformable rubber member and means for attaching the same to an apertured support, comprising a T-shaped slot extending longitudinally of one surface of said member with the stem of such T extending to such surface, a continuous metal strip engaged in the cross portion of such slot and having downwardly turned edge portions parallel to the lengthwise direction of such slot, and a plurality of stem members secured to said strip and protruding from such slot adapted to be secured in correspondingly spaced apertures in such support.

14. An automobile suspension bumper comprising a resilient rubber cushioning member designed to be manufactured by extruding in continuous lengths and then cutting into desired sections, said member having a generally arcuate face adapted to receive blows in use and an oppositely directed substantially flat face adapted to engage a supporting surface on which said bumper is to be mounted, a T-shaped slot in said flat face with the stem of such T extending toward and to said flat face, and separate attaching means for said rubber member comprising a generally flat metal member adapted to be inserted and to fit in the head of said T-shaped slot transversely of such stem portion, and means adapted forcibly to secure said metal member to such support with resultant compressive deformation of the intervening portion of said resilient cushioning member.

15. In combination, a resilient cushioning member and means for attaching the same to a support, comprising a member of resilient deformable material having a T-shaped slot in one surface thereof with the stem of such T extending toward and to such surface, and separate attaching means comprising a metal member adapted to be inserted and fit in the head of such T-shaped slot transversely of such stem portion, and means adapted to secure said metal member to such support under tension with resultant compressive deformation of the interposed resiliently deformable material.

16. A resiliently deformable cushioning member having a slot therein, a rigid mounting member engaged in such slot and attaching means adapted to engage both said mounting member and a rigid support forcibly to draw said mounting member toward such support to clamp said cushioning member in place with resultant compressive deformation of the resiliently deformable material interposed between said mounting member and such support.

17. The combination in accordance with claim 2 wherein said attaching means comprises a bolt having a wide downwardly cupped head engaged in the cross portion of such slot with the stem of such bolt protruding from such T slot.

18. The combination in accordance with claim 2 wherein said attaching means comprises a bolt having a wide downwardly cupped head engaged in the cross portion of such slot with the stem of such bolt protruding from such T slot and the means operative to secure said stem in such aperture and thereby forcibly to draw said head portion toward such support to grip such deformable material therebetween comprises a nut threadedly engaging said stem.

19. The combination in accordance with claim 2 wherein said attaching means comprises a continuous metal strip engaged in the cross portion of such slot and the stem portion comprises a plurality of recurved stem members secured to said metal strip and protruding from such slot adapted to enter correspondingly spaced apertures in such support and clampingly engage the side of the latter opposite to said resilient cushioning member.

GEORGE L. MEYERS.
JOHN C. SHUTT.

REFERENCES CITED

The following references are of record in the file of this patent:

UNITED STATES PATENTS

| Number | Name | Date |
|---|---|---|
| 1,241,756 | Nielsen | Oct. 2, 1917 |
| 1,580,015 | Clark | Apr. 6, 1926 |
| 1,779,346 | Trachte | Oct. 21, 1930 |
| 1,800,609 | Drake | Apr. 14, 1931 |
| 1,826,133 | Hatch | Oct. 6, 1931 |
| 1,873,871 | Carr | Aug. 23, 1932 |
| 1,937,818 | French | Dec. 5, 1933 |
| 1,960,381 | Knapp | May 29, 1934 |
| 2,004,679 | Tinnerman | June 11, 1935 |
| 2,013,446 | Reiter | Sept. 3, 1935 |
| 2,085,660 | Jackson | June 29, 1937 |
| 2,116,690 | Woodings | May 10, 1938 |
| 2,169,503 | Schlegel | Aug. 15, 1939 |
| 2,229,996 | Churchill | Jan. 28, 1941 |
| 2,244,975 | Tinnerman | June 10, 1941 |
| 2,277,443 | Livingston | Mar. 24, 1942 |
| 2,303,148 | Tinnerman | Nov. 24, 1942 |
| 2,328,378 | Dudley | Aug. 31, 1943 |
| 2,381,298 | Davis | Dec. 18, 1945 |

FOREIGN PATENTS

| Number | Country | Date |
|---|---|---|
| 512,986 | Great Britain | Oct. 2, 1937 |
| 102,938 | Australia | Jan. 20, 1938 |